United States Patent
Oike et al.

[11] Patent Number: 6,104,459
[45] Date of Patent: Aug. 15, 2000

[54] LIQUID-CRYSTAL DISPLAY UNIT, AND PROCESS FOR MANUFACTURING THE SAME

[75] Inventors: Kazuo Oike; Kozo Gyoda, both of Nagano, Japan

[73] Assignee: Seiko Epson Corporation, Japan

[21] Appl. No.: 09/029,913

[22] PCT Filed: Jul. 11, 1997

[86] PCT No.: PCT/JP97/02426

§ 371 Date: Mar. 10, 1998

§ 102(e) Date: Mar. 10, 1998

[87] PCT Pub. No.: WO98/02775

PCT Pub. Date: Jan. 22, 1998

[30] Foreign Application Priority Data

Jul. 11, 1996 [JP] Japan .................................. 8-182515

[51] Int. Cl.$^7$ .................................................. G02F 1/1335
[52] U.S. Cl. ........................................... 349/105; 349/106
[58] Field of Search ............................... 349/51, 52, 106, 349/107, 105

[56] References Cited

U.S. PATENT DOCUMENTS 4,775,549 10/1988 Ota et al. ................................. 349/187
5,684,552 11/1997 Miyamoto et al. ....................... 349/107
5,719,647 2/1998 Fujikawa et al. .......................... 349/51

FOREIGN PATENT DOCUMENTS

52-10696  1/1977  Japan .
63-77018  4/1988  Japan .

*Primary Examiner*—Walter Malinowski
*Attorney, Agent, or Firm*—Harness, Dickey & Pierce, P.L.C.

[57] ABSTRACT

The present invention provides a liquid-crystal display device and a process for manufacturing the same, wherein the unit achieves an inhibition of reduction in the displaying brightness even when used for a color reflection-type liquid-crystal display device, and a restriction of variation in the color tone which varies depending on the quantity of incident light. For each of the pixel regions, a pixel reflective layer 13 is formed with Ta. On the surface of each of a plurality of the pixel regions, three anodic oxide films 13a, 13b and 13c are formed with mutually different thicknesses. The thicknesses of the anodic oxide films are determined such that light reflected by the pixel reflective layer 13 is colored into three different colors.

13 Claims, 9 Drawing Sheets

LIQUID-CRYSTAL DISPLAY UNIT, AND PROCESS FOR MANUFACTURING THE SAME

BACKGROUND OF THE INVENTION

1. Field of the Invention

The present invention relates to a liquid-crystal display device and a process for manufacturing the same, and more particularly, relates to a structure of a reflection-type color liquid-crystal display device.

2. Description of the Related Art

Conventional liquid-crystal display devices can be classified into a transmission type or a reflection type. In the former type, a back light is disposed behind the unit, and light from the back light is made to pass through the liquid-crystal pixels, and therefore, the consumption of electric power is large, though bright displaying can be achieved. On the other hand, in the latter type, such a back light is unnecessary since displaying is achieved according to the reflection of light incident on the liquid-crystal pixels, and therefore, the consumption of electric power can be saved, though displaying is generally dark and the displayed information cannot be recognized in a place without external light.

Meanwhile, as a means for making a liquid-crystal display device to be of a color type, a color filter is generally disposed on the inner surface of one of two substrates sandwiching a liquid-crystal layer.

For achieving such a color filter, a plurality of filters which are formed by printing and shaping materials containing pigments and which have colors similar or close to the three primary colors are disposed for each pixel in accordance with a predetermined arrangement.

In the above-described conventional liquid-crystal display devices, however, the light intensity is lowered after light passes through the color filter. Accordingly, in the case of a reflection-type liquid-crystal display device, which exhibits dark displaying, the display brightness is further lowered, and in addition, since the color tone exhibited by the color filter varies depending on the quantity of incident light which varies in relation to the surrounding environment, a readily-recognizable display area, which can be achieved in the transmission type, can rarely be achieved.

SUMMARY OF THE INVENTION

Accordingly, the object of the present invention is to solve the above-described problems, and to provide a liquid-crystal display device and a process for manufacturing the same, wherein the unit achieves an inhibited reduction of the display brightness even when used for a color reflection-type liquid-crystal display device, and a restricted variation in the color tone which varies depending on the quantity of incident light.

In order to achieve the above object, according to an aspect of the present invention, there is provided a display device characterized by:

a reflective layer disposed for each of pixel regions where pixel electrodes are arranged on one substrate among a pair of substrates sandwiching liquid crystals;

several types of light-transmissive thin films on the surface of each reflective layer, each of the thin films having a predetermined thickness and/or a predetermined refractive index; and coloration of light reflected by the reflective layer into mutually-different interference colors which are substantially determined in accordance with the thicknesses and/or the refractive indexes of the several types of the light-transmissive thin films.

According to this aspect, light reflected by the reflective layer causes interference due to the light-transmissive thin films, and is colored into interference colors determined by the thicknesses and/or the refractive indexes of the light-transmissive thin films, thus being visibly recognized.

It is, therefore, unnecessary to provide conventional transmission-type color filters, and accordingly, the quantity of reflected light is not reduced and the color tone does not vary in relation to the quantity of incident light. Further, since a color display device can be achieved only by controlling the thicknesses or the refractive indexes of the light-transmissive thin films, the manufacture of the unit is easier than the conventional case in which color filters are formed.

Moreover, there is provided such a display device, wherein the reflective layers are conductors, and the light-transmissive thin films are anodic oxide films formed into predetermined thicknesses by anodically oxidizing the surfaces of the reflective layers.

According to this aspect, since the reflective layers are conductors, oxide films formed by anodic oxidation can be made to serve as light-transmissive thin films. By anodic oxidation, the film thicknesses can be controlled based on the applied voltage or the time period for applying electric power, and high-quality light-transmissive thin films can be formed with high reproducibility.

Each of the conductors may be a valve metal, and the valve metal is preferably one metal among Al, Ti, V, Y, Zr, Nb, In, La, Hf, Ta, and W.

These metals are preferred since each of the anodic oxide films derived therefrom is dense, has a high refractive index, and exhibits an interference color even if it is a thin oxide film.

Further, there is provided such a display device, wherein reflective layers are metallic layers concurrently serving as the aforementioned pixel electrodes.

According to this aspect, since reflective layers are a metallic layer concurrently serving as pixel electrodes, it is unnecessary to newly provide pixel electrodes, and the inner structure of the liquid-crystal display device can be simplified.

Moreover, there is provided a process including the steps of:

forming a reflective layer for each of pixel regions where a plurality of pixel electrodes are arranged on the inner surface of one substrate among a pair of substrates sandwiching liquid crystals; and forming several types of light-transmissive thin films having different thicknesses and/or different refractive indexes corresponding to the colors of light reflected by the reflective layers.

According to this aspect, light reflected by the reflective layers causes interference due to the light-transmissive thin films, is colored into interference colors determined in accordance with the thicknesses and/or refractive indexes of the light-transmissive thin films, thus being visibly recognized.

It is, therefore, unnecessary to provide conventional transmission-type color filters, and accordingly, the manufacture of the unit is easier than the conventional case where such color filters are formed.

Furthermore, there is provided such a process, wherein the reflective layers are formed with conductors, and the light-transmissive thin films are formed into predetermined thicknesses by anodically oxidizing the surfaces of the reflective layers.

According to this aspect, since anodic oxidation is employed, the film thicknesses can be controlled based on the applied voltage or the time period for applying electric power, and high-quality light-transmissive thin films can be formed with high reproducibility.

Still further, there is provided such a process further including the step of forming two-terminal-type active devices, each of which principally consisting of a first electrode, an insulator obtained by anodically oxidizing the first electrode, and a second electrode, wherein the reflective layers are formed with the same material as that for the first electrode, and the light-transmissive thin films are formed at the same time as the step of forming the insulator.

According to this aspect, the light-transmissive thin films on the reflective layers can be formed simultaneously in a part of the step of forming the two-terminal-type active devices, and the manufacturing process can be simplified.

DESCRIPTION OF THE PREFERRED EMBODIMENT

Figure 1:
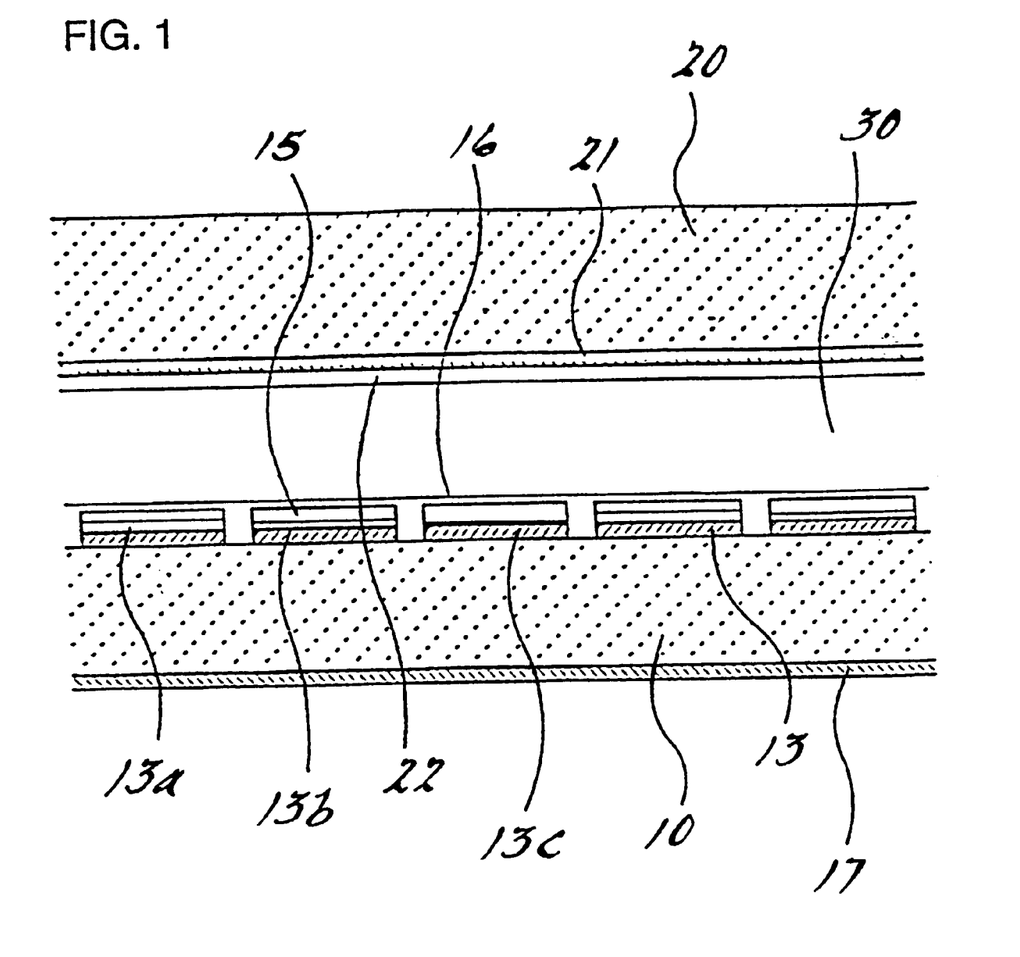
FIG. 1 is longitudinal sectional view showing the schematic structure of an embodiment of the liquid-crystal display device according to the present invention.

Next, embodiments according to the present invention will be illustrated with reference to the attached drawings. FIG. 1 is a longitudinal sectional view showing the schematic structure of a reflection-type liquid-crystal display device according to the present invention, FIG. 2 is an enlarged plan view showing the planar profile of the substrate on the reflection side in the same embodiment, and FIG. 3 includes diagrams showing the process for manufacturing reflection layers and light-transmissive thin films.
<EMBODIMENT 1>

In this embodiment, pixel electrodes 15 consisting of ITO (indium-tin oxide) and an opposing electrode 21 are formed on the inner surfaces of two glass substrates 10 and 20, respectively, and the pixel electrodes 15 are opposed to the opposing electrode 21 through a liquid-crystal layer 30.

The glass substrate 10, on the inner surface of which an MIM (metal-insulator-metal) device being a two-terminal-type active device is formed for each pixel region, has the pixel electrodes 15 connected to the MIM devices, and is a substrate on the reflection side where the reflective layers are formed. The glass substrate 20 is an opposing substrate having the opposing electrode 21 which is opposite to the aforementioned pixel electrodes 15.

Figure 2:
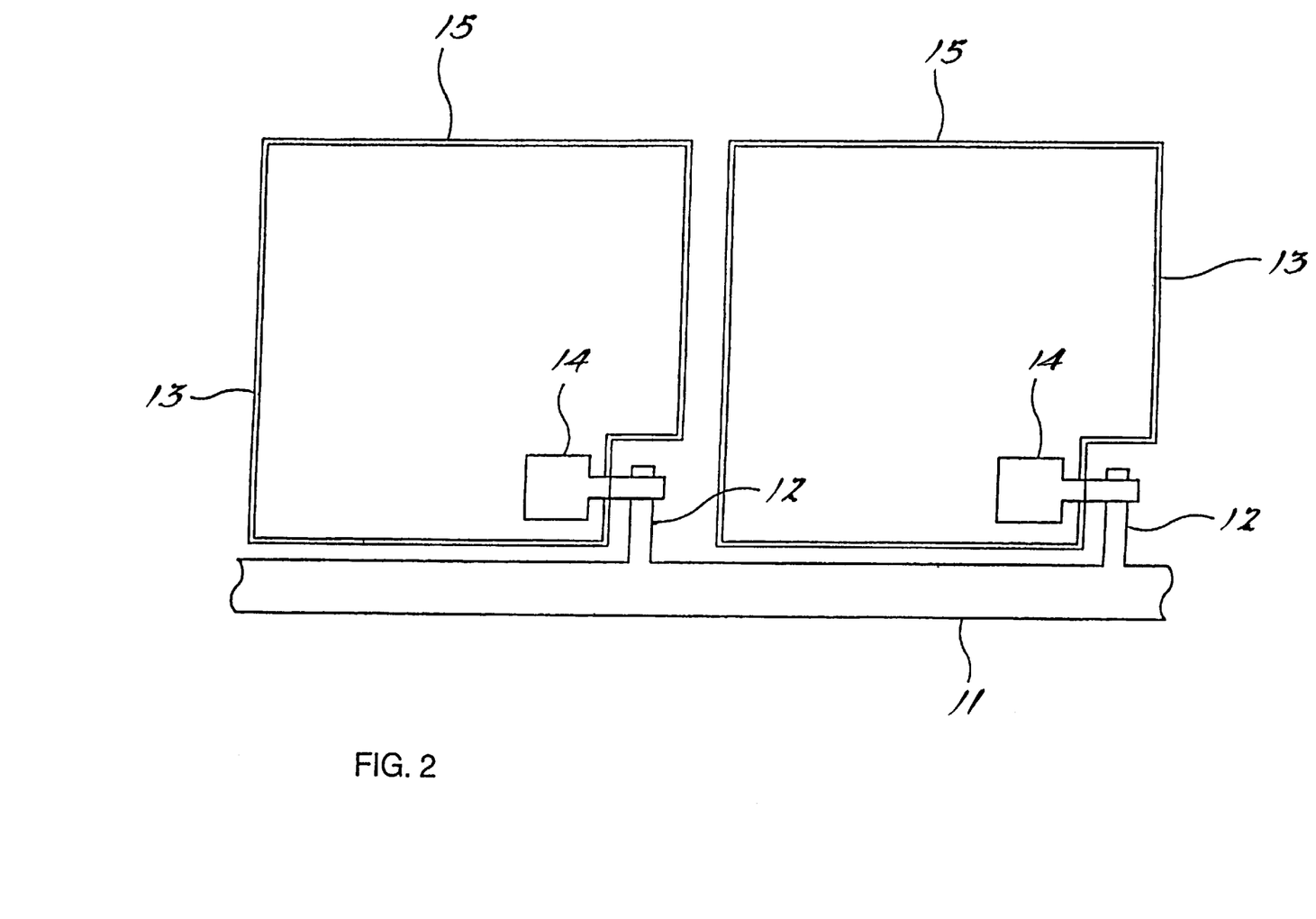
FIG. 2 is a plan view of the substrate on the reflection side in the same embodiment.

On the inner surface of the glass substrate 10, an underlying layer is formed in order to improve adhesion between Ta and the substrate, and Ta is then deposited by a sputtering method (FIG. 3A) and patterned into a predetermined pattern to form pixel reflective layers 13 provided for respective pixel regions (FIG. 3B) together with a wiring layer 11 shown in FIG. 2 in the direction along which the pixel regions are arranged.

Each of a plurality of the pixel reflective layers 13 is in a state of having been patterned to be conductively connected with any of non-illustrated three systems of conductive-connecting lines.

Figure 3A:
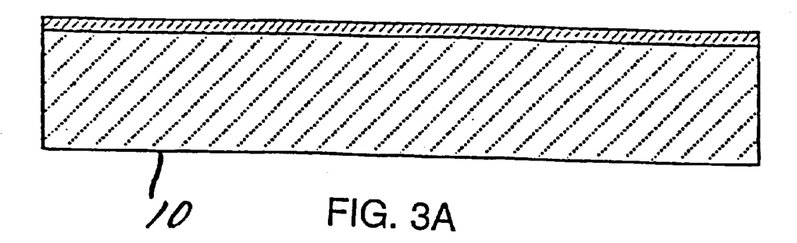
FIGS. 3A to 3D are schematic diagrams showing the steps of manufacturing the substrate on the reflection side in the same embodiment.
Figure 3B:
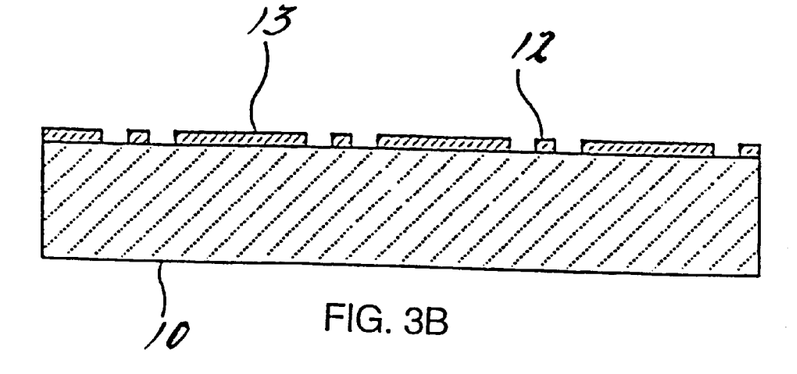
Figure 3C:
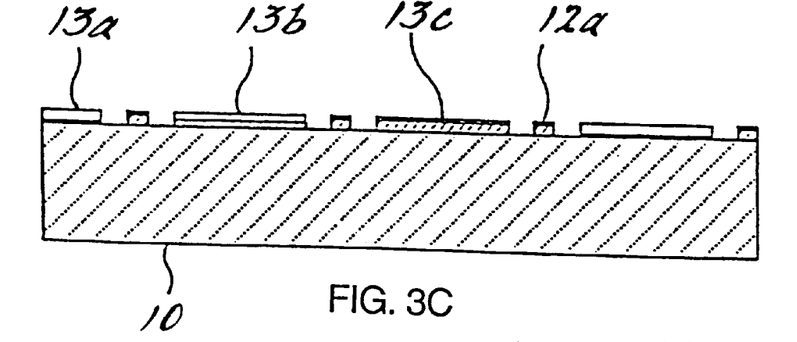

In the aforementioned wiring layer 11, a protruded first electrode portion 12 is integrally formed for each pixel region, as shown in FIG. 2. Anodic oxide films are formed on the surfaces of the first electrode portions 12 and the surfaces of the pixel reflective layers 13 (FIG. 3C).

Figure 4:
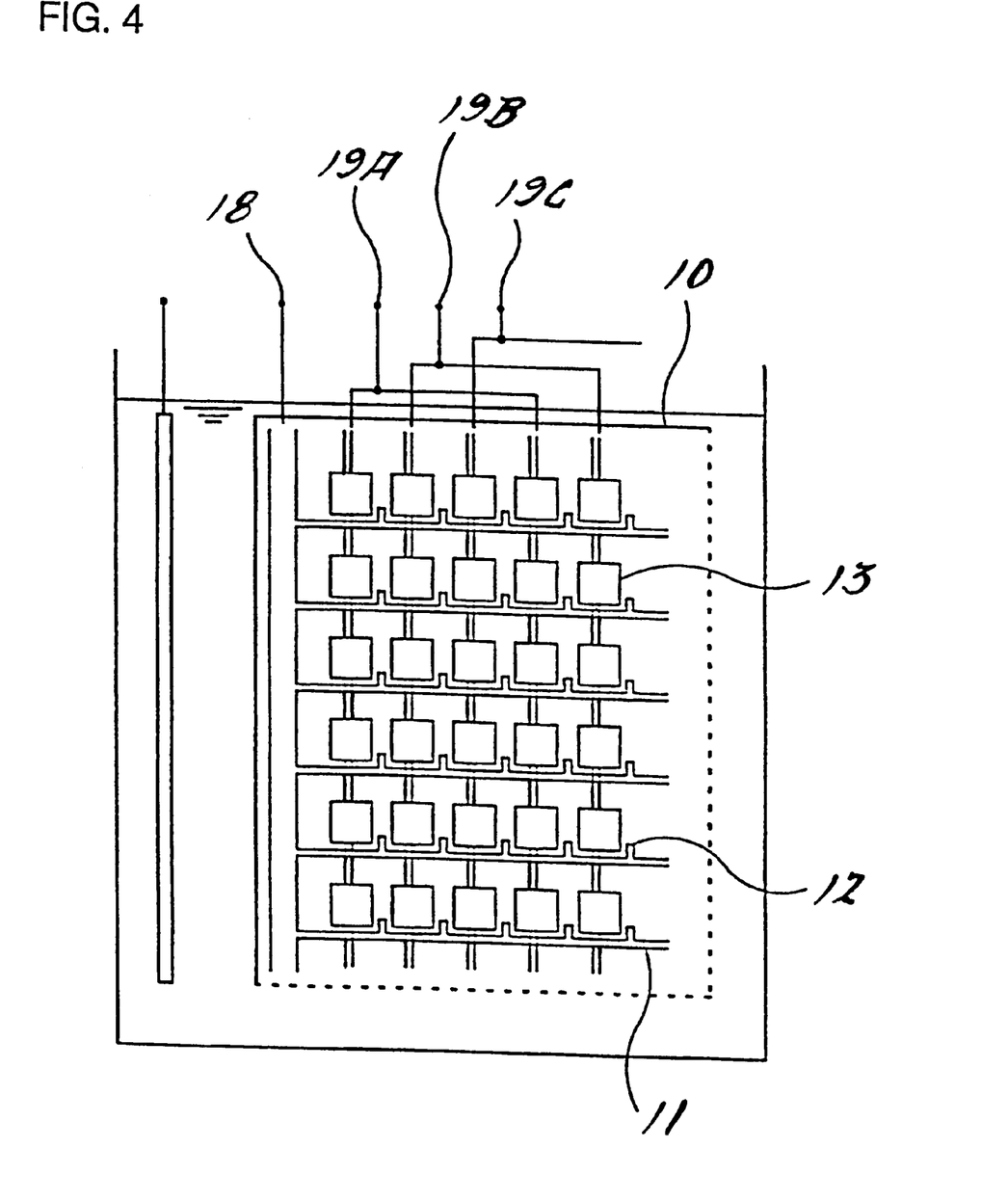
FIG. 4 is a schematic diagram showing the state of the substrate on the reflection side in a step of anodic oxidation.

FIG. 4 is a schematic diagram showing the situation of an anodic oxidation. In the anodic oxidation, the surfaces of the conductors are oxidized by applying predetermined voltages between the conductors and an electrolytic solution under the condition that the inner surface of the glass substrate 10 is immersed in the electrolytic solution.

As such an electrolytic solution for the anodic oxidation, for example, a citric acid aqueous solution having a concentration of 0.05% by weight is used. The application of the voltages to the glass substrate 10 is performed through the wiring layer 11 connected to a power-supplying line 18 shown in FIG. 4 for the above-described first electrode portions 12, and through three systems of the conductive-connecting lines 19A, 19B and 19C shown in FIG. 4 for the above-described pixel reflective layers 13.

Regarding the voltages for the anodic oxidation, the voltage applied through the wiring layer 11 is set at 31 V while the current density is restricted to 0.04 mA. As for the voltages for the anodic oxidation applied through the conductive-connecting lines 19A, 19B and 19C, mutually different voltages are applied which are adjusted in accordance with the predetermined thicknesses of the oxide films which should be formed on the surfaces of the pixel reflective layers 13.

By anodic oxidation, an oxide film principally consisting of $Ta_2O_5$ is formed on the surface of each Ta layer. The thickness of the oxide film is substantially determined based on the anodic oxidation voltage applied between the conductors and the electrolytic solution.

Table 1 described below shows the growth rate of each oxide film and the film thickness achieved by an unit electric field which are observed in several types of so-called valve metals including Ta.

TABLE 1

Properties of Anodic Oxide Films of Valve Metals

| Oxide | Growth Rate of Oxide Film | Film Thickness per Unit Electric Field |
| --- | --- | --- |
| $TiO_2$ | 5.38 Å/mAsec | 16.3 Å/V |
| $ZrO_2$ | 5.81 | 27.5 |
| $HfO_2$ | 5.61 | 21.3 |
| $Nb_2O_5$ | 6.14 | 24.4 |

TABLE 1-continued

Properties of Anodic Oxide Films of Valve Metals

| Oxide | Growth Rate of Oxide Film | Film Thickness per Unit Electric Field |
| --- | --- | --- |
| $Ta_2O_5$ | 5.23 | 15.6 |

On the surface of each pixel reflective layer 13, oxide films are formed, which have thicknesses corresponding to the below-described interference colors. Each of the oxide films has a specific dielectric constant and a refractive index in accordance with its material, and exhibits a specific interference color principally corresponding to its refractive index and thickness. Such an interference color is generated since interference occurs between light reflected by an oxide film being a light-transmissive thin film and light reflected by a pixel reflective layer 13, and the intensity of light becomes maximum when the difference between both the optical pathlengths is an integral multiple value of the wavelength. More specifically, when the refractive index of a light-transmissive thin film is represented by n, its thickness is represented by d, and the incident angle of light is represented by 2, the wavelength λ where the intensity of light is maximum is calculated by $\lambda = 2nd \times \cos \theta \times m$ (m is a positive integer).

Accordingly, the tone of the above-mentioned interference color varies depending on the refractive index and the thickness of the light-transmissive thin film. In order to achieve an intensive interference color, the quantity of reflected light on the surface of the light-transmissive thin film should be made to be close to the quantity of reflected light on the pixel reflective layer.

In general, the material of the light-transmissive thin film should preferably be selected from those having high refractive indexes. Some properties of oxides obtained by an anodic oxidation method are shown in Table 2 below.

TABLE 2

Physical Constants of Oxide Films of Valve Metals

| Oxide | Dielectric Constant | Refractive Index | Density |
| --- | --- | --- | --- |
| $TiO_2$ | 66.1 | 2.21 | 3.81 |
| $ZrO_2$ | 31.1 | 2.16 | 5.49 |
| $HfO_2$ | 41.1 | 1.88 | 9.68 |
| $Nb_2O_5$ | 47.1 | 2.21 | 4.47 |
| $Ta_2O_5$ | 25.2 | 2.56 | 8.74 |

As shown in Table 2, the dielectric constant greatly varies depending on the material of the oxide film.

Accordingly, in order to obtain a plurality of different interference colors, plural types of light-transmissive thin films derived from different materials may be formed, or plural types of light transmissive thin films derived from a similar material but having different thicknesses may be formed. Ordinarily, it is easier to achieve different thicknesses using a similar material. Alternatively, light-transmissive thin films which are based on different combinations of material and thickness corresponding to the desired color tones, respectively, may be formed, for example, in a manner such that a first color tone is achieved with a first metal and a first thickness, a second color tone is achieved with a second metal and a second thickness, a third color tone is achieved with a third metal and a third thickness, and so on.

For example, when oxide films consisting of tantalum oxide are formed on surfaces of pixel reflective layers 13 while varying the thickness, several interference colors can be obtained as shown in Table 3, below.

TABLE 3

Thickness and Interference Color of Oxide Film of Valve Metal

| $Ta_2O_5$ Thickness (C) | Interference Color |
| --- | --- |
| 764 | Brown |
| 1102 | Ultramarine Blue |
| 1524 | Sky Blue |
| 1700 | Light Blue |
| 2124 | Yellow |
| 2469 | Orange |

Referring to the relationship between the film thickness and the interference color shown in Table 3, three oxide films having different thicknesses are formed on the surface of each pixel reflective layer 13 through the above-described three conductive-connecting lines, such that a combination of a plurality of color tones which achieves expression of as many colors as possible by gradation control in each pixel region, such as a combination of ultramarine blue, light blue, and orange, can be obtained based on the interference colors on each pixel reflective layer 13.

In this embodiment, an anodic oxide film 12a is formed on the surface of each first electrode portion 12 according to the above-described anodic oxidation step, and meanwhile, three anodic oxide films 13a, 13b, and 13c with different thicknesses are formed on the surface of each pixel reflective film 13.

Next, Cr is deposited by sputtering, and patterned to form second electrode layers 14 such that each of the layers covers the area from the first electrode portion 12 to the pixel reflective layer 13. In this manner, each of the above-described first electrode portion 12, the anodic oxide film 12a formed on the surface of the first electrode portion 12, and the second electrode layer 14 formed on the anodic oxide film 12a function as an MIM device in combination.

Figure 3D:
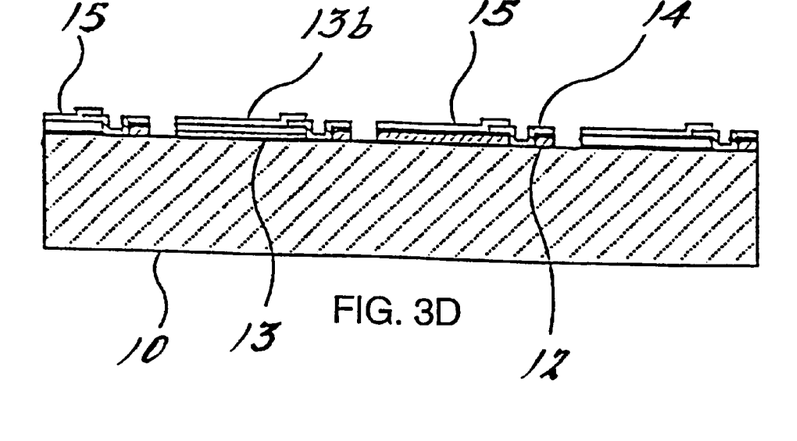

Next, ITO is deposited by a sputtering method, and subjected to a predetermined patterning treatment to form transparent pixel electrodes 15 which are connected to the second electrode layers 14 and substantially entirely cover the above-described pixel reflective layers 13 (FIG. 3D). On the surface of each of these pixel electrodes 15, an alignment film 16 is formed with a transparent resin such as a polyimide, and a rubbing treatment is performed.

Incidentally, although a case using ITO for the pixel electrodes is illustrated by this embodiment, the transparent electrode material is not limited to that, and for example, those consisting of refractory metals such as $SnO_x$ or $ZnO_x$ can also be used.

On the outer surface of the glass substrate 10, a metal such as aluminum is vapor-deposited to form a back-surface reflective layer 17.

Meanwhile, on the inner surface of the glass substrate 20 being an opposing substrate, opposing electrodes 21 respectively opposite to the pixel electrodes 15 are formed with ITO, an alignment film 22 similar to the aforementioned one is deposited on the surface of each of these opposing electrodes 21, and a rubbing treatment is performed.

Figure 5:
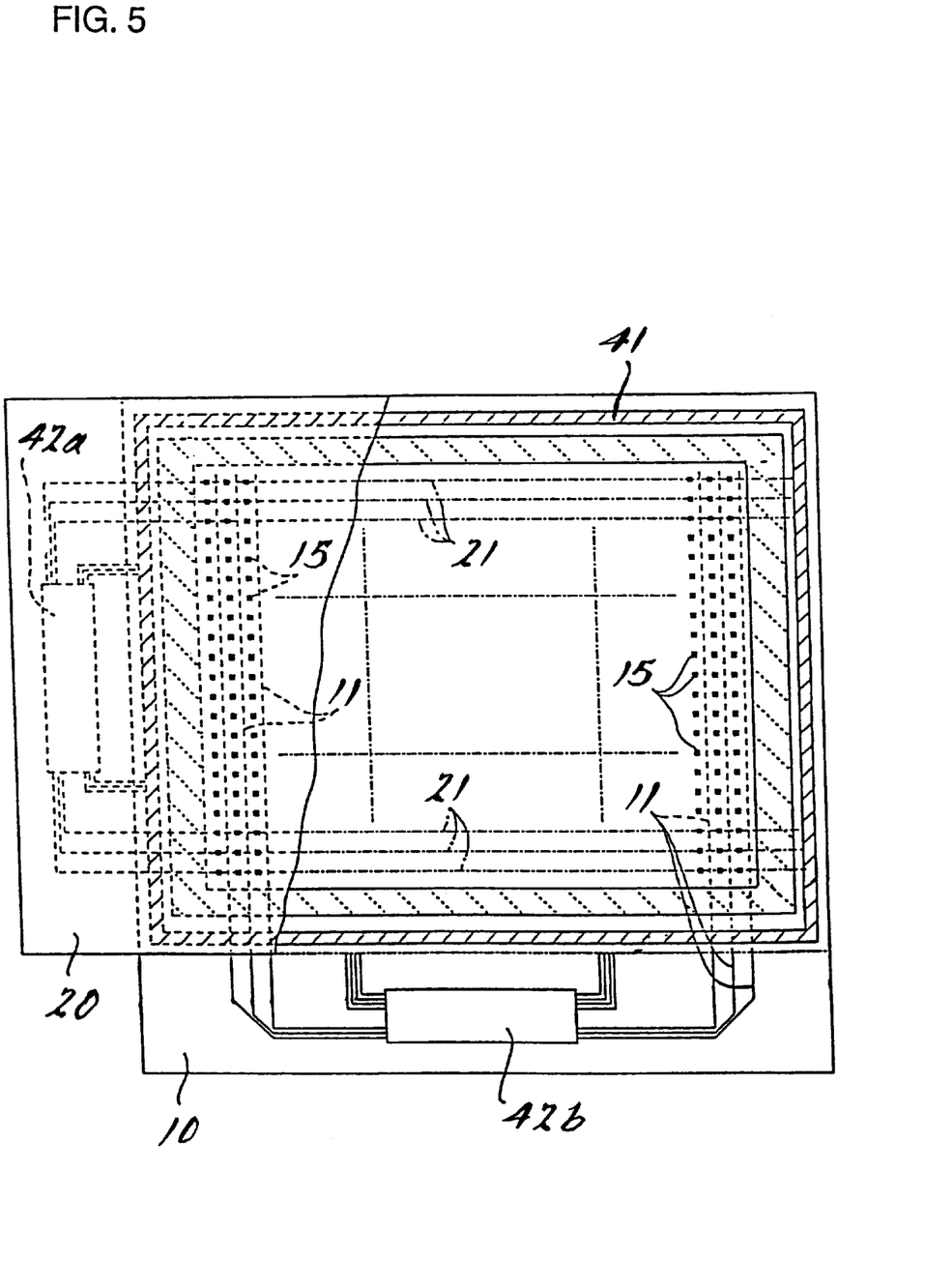
FIG. 5 is a block diagram showing the schematic structure of an embodiment of the liquid-crystal display device according to the present invention.

The above-described glass substrates 10 and 20 are laminated through a sealing material 41, as shown in FIG. 5, and a liquid crystal layer 30 is formed by filling the liquid-crystal-sealing region partitioned by the sealing material with liquid crystals. Further, peripheral circuit parts such as driving circuits 42a and 42b are mounted, thus composing a liquid-crystal display device.

In the liquid-crystal display device according to the above-described embodiment, light incident from the side of the glass substrate 20 passes through the liquid-crystal layer 30, then is reflected by the pixel reflective layer 13 in each pixel region, and passes through the liquid-crystal layer 30 to be visibly recognized. In each pixel region, by controlling the voltage applied between the pixel electrode 14 and the opposing electrode 21, the liquid-crystal layer 30 can be controlled so as to exhibit predetermined optical properties (such as the polarization state, transmittance, and the like), and therefore, the display plane can be made into a desired display state by individually controlling the pixel electrodes.

In this embodiment, reflected light is made to exhibit interference colors by forming thin oxide films on the surfaces of the pixel electrodes 13, and desired color tones are thereby obtained. Accordingly, in contrast to the conventional cases, it is not necessary to provide transmission-type color filters, thus the unit can be relatively readily obtained, and a reduction in the display brightness can be inhibited.

Further, in the conventional reflection-type liquid-crystal display devices, since the light-transmission properties of the color filters are constant, the obtained color tones can vary depending on the quantity of external light. In contrast, when interference colors by reflection are utilized such as in this embodiment, the variation in the color tones is relatively small even if the quantity of external light varies.

Although in this embodiment the light-transmissive thin films are obtained by oxidizing pixel reflective layers, several types of thin films can be used without being limited to such oxide films so long as they possess refractive indexes necessary for obtaining interference colors. Particularly in this embodiment, high-quality thin films having high refractive indexes can be obtained according to anodic oxidation, the film thicknesses can be readily controlled, and high reproducibility concerning the film thicknesses can be relatively readily achieved. Accordingly, high-quality liquid-crystal display device can be readily manufactured.

Incidentally, although in this embodiment a glass substrate 10 is used as the substrate on the reflection side, an opaque substrate such as a silicon substrate may be used as the substrate on the reflection side.

Moreover, although in this embodiment the pixel reflective layers and the light-transmissive thin films are formed separately from the pixel electrodes, for example, the pixel reflective layers themselves can be used as pixel electrodes. In such a case, the pixel reflective layers should be connected to the wiring layers or the second electrode layers.

Furthermore, although in this embodiment pixel reflective layers are provided for pixel regions, and oxide films are formed thereon, an integral pixel reflective layer may be formed on condition that oxide films are formed with varied film thicknesses for pixel regions. In such a case, the back-surface electrode layer 17 is unnecessary. Similarly, in the case that each pixel reflective layer is surrounded and shielded with a black matrix, such a back-surface electrode layer 17 is also unnecessary.

<EMBODIMENT 2>

Next, another embodiment is illustrated which is a matrix-type liquid-crystal display device including TFT (thin film transistor) devices as three-terminal-type active devices.

Figure 6:
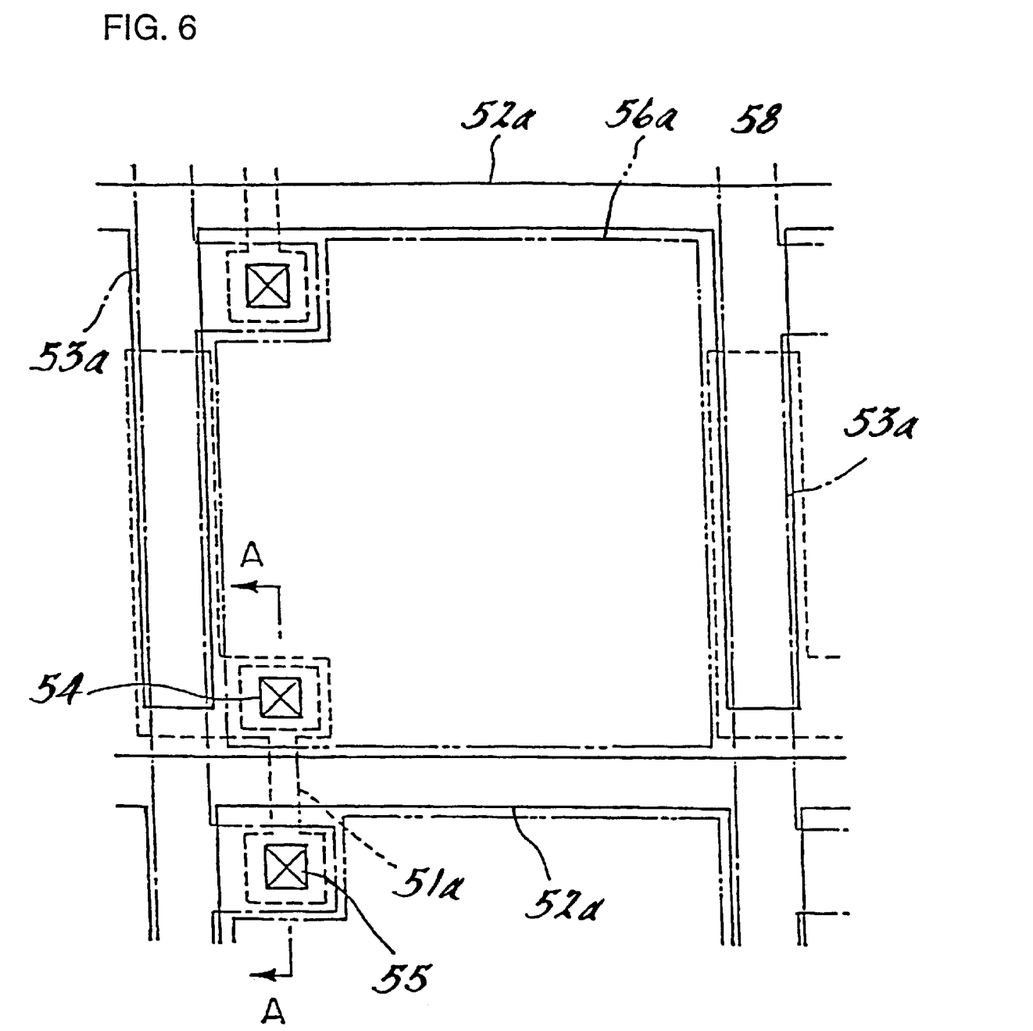
FIG. 6 is a plan view showing the schematic structure of an embodiment of the liquid-crystal display device according to the present invention.
Figure 7:
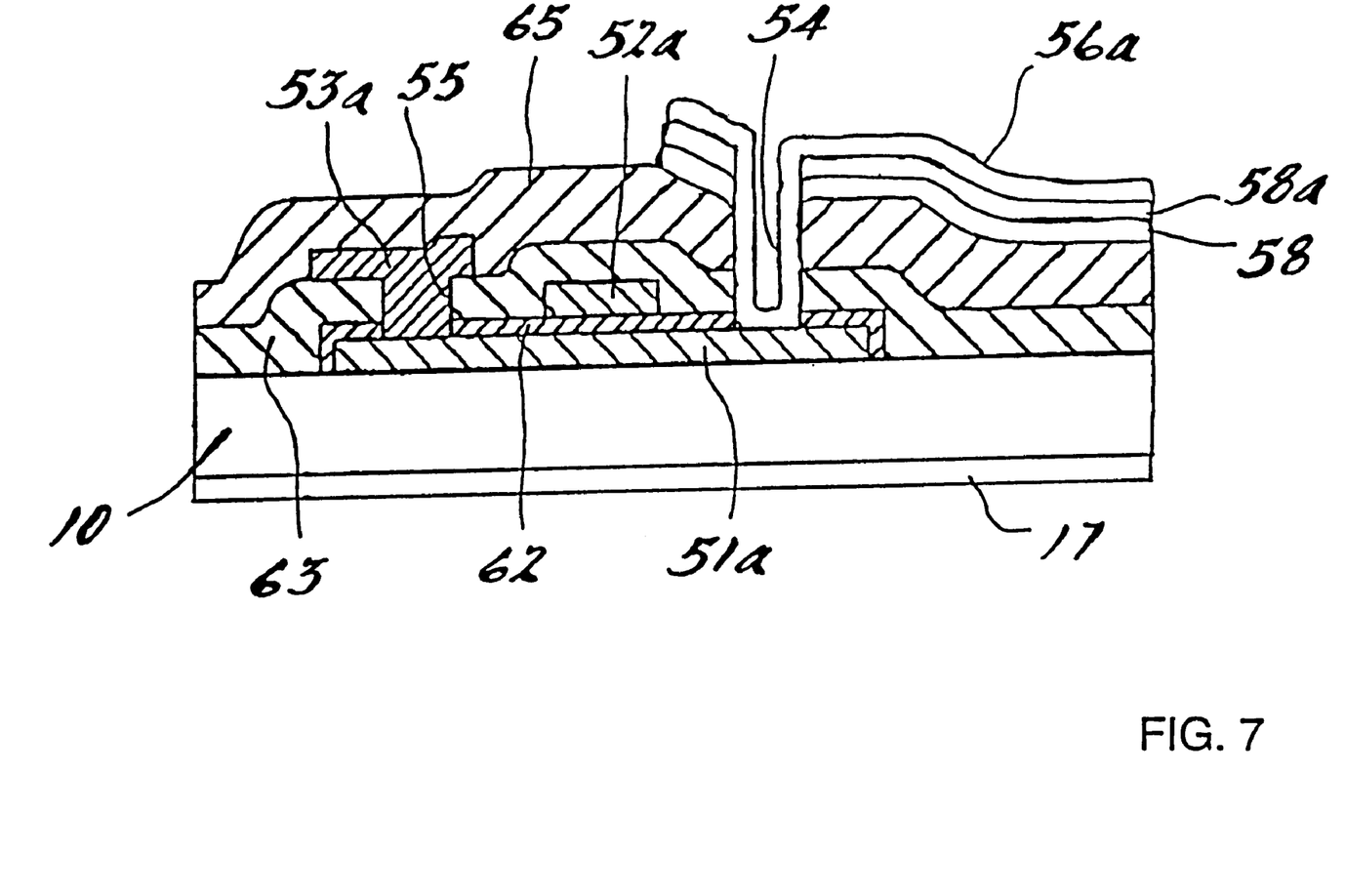
FIG. 7 is a longitudinal sectional view showing the schematic structure of an embodiment of the liquid-crystal display device according to the present invention.

FIG. 6 is a plan view showing a schematic structure of a pixel in a liquid-crystal display device according to the present invention including a TFT (thin film transistor) devices, and FIG. 7 is a sectional view across the line A—A in FIG. 6.

Initially, the pixel structure is illustrated. In FIG. 6, 51a indicates a first polysilicon layer constituting the active layer (source-drain-channel region) of the TFT, and gate insulating film 62 is formed on the surface of the polysilicon layer 51a by thermal oxidation, as shown in FIG. 7. 52a indicates a scanning line serving as the gate electrode of the TFT, and 53a indicates a data line which is provided so as to cross the scanning line 52a and which supplies a voltage applied to the pixel electrode to the source region (or the drain region) of TFT. The scanning line 52a is formed of a second polysilicon layer, and the data line 53a is formed of a conductive layer such as an aluminum layer.

Further, 54 indicates a contact hole connecting a pixel electrode 56a formed of ITO to the drain region (or source region) of the polysilicon layer 51a of the TFT, 55 indicates a contact hole connecting the data line 53a to the source region of the polysilicon layer 51a of the TFT.

In FIG. 7, showing the section along the line A—A of FIGS. 6, 10 indicates a substrate such as a glass substrate, a quartz substrate, or a silicon substrate, and 62 is a gate insulating film formed by thermal oxidation or the like on the surface of the polysilicon layer 51a serving as the active layer of the TFT. Further, 63 indicates a first interlayer insulating film consisting of an NSG film (a silicate glass film free of boron and phosphorus) or the like, and 65 indicates a second interlayer insulating film consisting of BPSG film (a silicate glass containing boron and phosphorus) or the like. These are formed by a high-temperature CVD method and a low-temperature CVD method, respectively.

In this embodiment, a pixel reflective layer 58 is formed on the second interlayer insulating film 65.

Similarly to Embodiment 1 above, the pixel reflective layer 58 is formed by patterning a valve metal such as Al, Ti, V, Y, Zr, Nb, In, La, Hf, Ta, or W into a predetermined shape for each pixel region, and an oxide film 58a serving as a light-transmissive thin film is formed by anodic oxidation of the pixel reflective layer 58.

In this anodic oxidation, the thickness of the oxide film can be relatively readily precisely controlled by altering the voltage applied to the metallic film or the time period for applying electric power, and a pixel reflective layer provided with an oxide film having a predetermined thickness can be achieved.

Here, several types of pixel reflective layers derived from different materials may be formed in order to obtain a plurality of different interference colors, or the pixel reflective layer may be formed such that it is provided with several types of oxide films derived from one material but having different thicknesses.

After the pixel reflective layer 58 is formed, the contact hole 54 is formed such that it penetrates the second interlayer insulating film 65, the first interlayer insulating film 63 and the gate insulating film 62, and the pixel electrode 56a is formed with ITO.

Incidentally, although in this embodiment ITO is used for the pixel electrode, the material for it is not limited to that, and for example, transparent electrode materials principally consisting of a refractory metal such as $SnO_x$ or $ZnO_x$ can also be used.

Further, although in this embodiment pixel reflective layers are provided for pixel regions, and oxide films are formed thereon, an integral pixel reflective layer may be formed on condition that oxide films are formed with film thicknesses varied for pixel regions. In such a case, a back-surface electrode layer 17 is unnecessary. Similarly, in the cas e that each pixel reflective layer is surrounded and shielded with a black matrix, such a back-surface electrode layer 17 is also unnecessary.

Figure 8A:
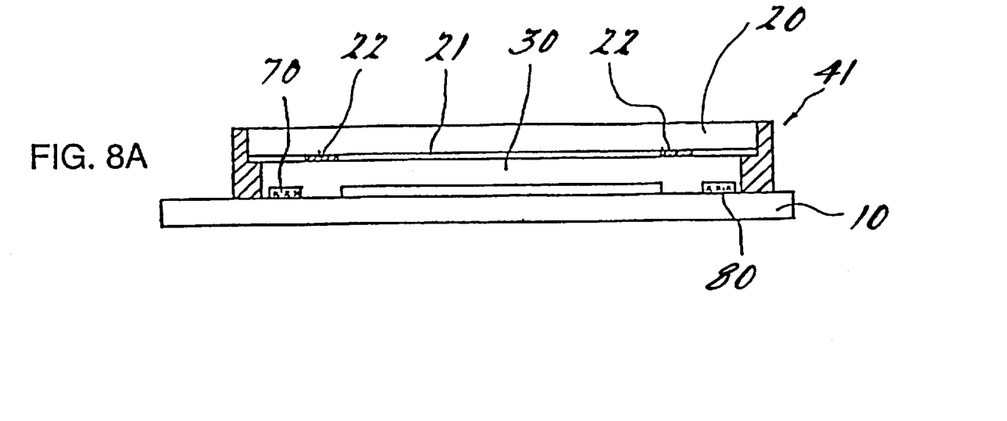
FIGS. 8A and 8B are block diagrams showing the schematic structure of an embodiment of the liquid-crystal display device according to the present invention.
Figure 8B:
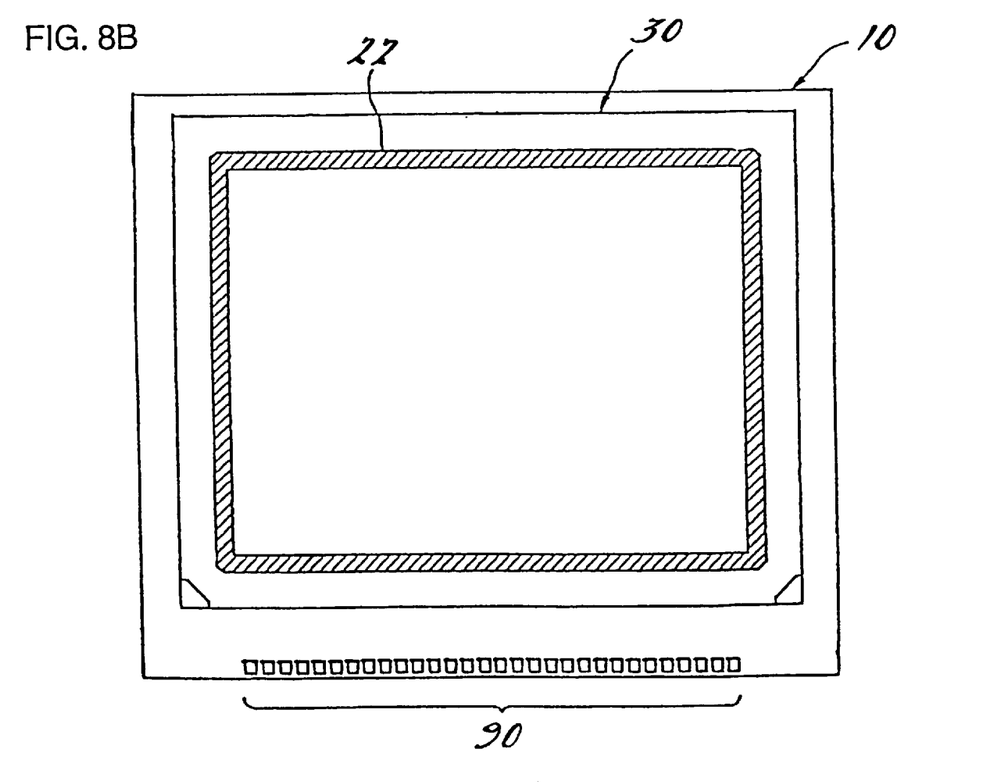

The reflection-side substrate having such a structure, and the opposite side substrate 20, which is disposed oppositely to the former and on which an opposing electrode 21 is formed, are laminated through a sealing material 41, as shown in FIGS. 8A and 8B. Incidentally, 22 indicates a shielding layer consisting of a chromium layer or the like formed on the opposing substrate 20.

A liquid-crystal-sealing region partitioned by the sealing material 41 is filled with liquid crystals 30, and a circuit substrate (not illustrated) to input image signals and the like which should be displayed in the pixel region is mounted on an input terminal portion 90, thus composing a liquid-crystal display device.

Incidentally, in this embodiment, the transistors as components of peripheral circuits 70 and 80 to send driving signals to a TFT device are each formed of a so-called polysilicon TFT which has a polysilicon layer as an active layer similar to the TFT device for pixel driving, and the transistors as components of peripheral circuits are simultaneously formed on the substrate in the same process as that to form the TFT device for pixel driving.

Although in this embodiment the light-transmissive thin films are obtained by oxidizing pixel reflective layers, several types of thin films can be used without being limited to such oxide films so long as they possess refractive indexes necessary for obtaining interference colors.

Further, as described in the illustration of Embodiment 1, light-transmissive thin films which are based on different combinations of material and thickness corresponding to the desired color tones, may be formed, for example, in a manner such that a first color tone is achieved with a first metal and a first thickness, a second color tone is achieved with a second metal and a second thickness, a third color tone is achieved with a third metal and a third thickness, and so on.

Moreover, although each of the above-described embodiments is composed as an active-matrix-type liquid-crystal display device including MIM devices or TFT devices, such active devices do not have to be included, and each embodiment can be applied to several reflection-type liquid-crystal display devices.

Furthermore, although in each of the above-described embodiments plural types of light-transmissive thin films are provided on one substrate to reflect colored light in a plurality of color tones, the liquid-crystal display device may be formed such that colored light is reflected in one color tone for one substrate, and a plurality of liquid-crystal display devices may be used and the color tones therefrom may be composed according to an optical mechanism, thus achieving display. For example, each embodiment can be applied to a projection-type display apparatus using three such liquid-crystal display devices.

Next, examples of the electronic equipment, to which the liquid-crystal display device of the present invention is applied, are illustrated.

Figure 9A:
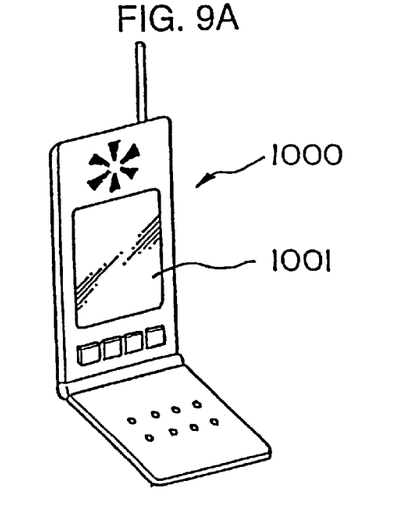
FIGS. 9A–9C are diagrams showing examples of electric equipment using the liquid-crystal display device according to the present invention.
Figure 9B:
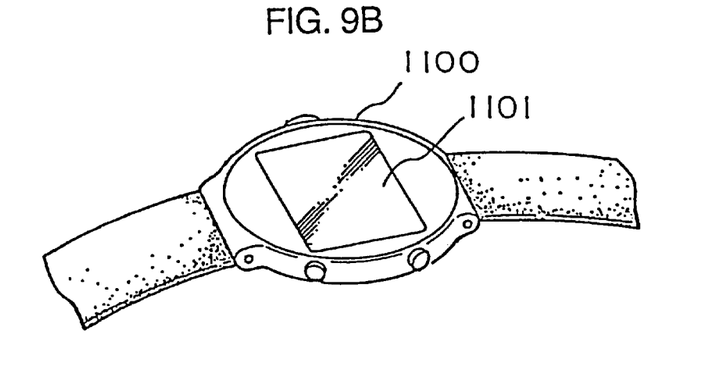
Figure 9C:
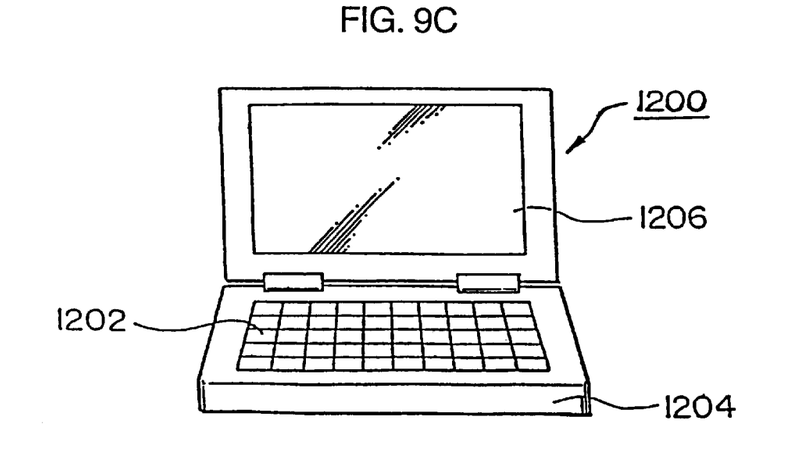

FIGS. 9A, 9B and 9C are perspective views, each showing an example of electronic equipment using the liquid-crystal display device of the present invention. Incidentally, since this electronic equipment is used as direct-viewing reflection-type liquid-crystal display devices, the reflective electrodes do not have to have perfect mirror surfaces. Rather, an appropriate unevenness should preferably be provided in order to expand the viewing angle.

FIG. 9A is a perspective view showing a mobile cellular telephone. 1000 indicates the main body of the mobile cellular telephone, and 1001 therein indicates a liquid-crystal display portion using the liquid-crystal display device of the present invention.

FIG. 9B is a view showing a watch-type electronic tool. 1100 indicates the main body of the watch, and 1101 indicates a liquid-crystal display portion using the liquid-crystal display device of the present invention.

Since this liquid-crystal display portion has pixels with a definition higher than that of the display portion of a conventional watch, it is capable of displaying television images, and therefore, a watch-type television set can be achieved.

FIG. 9C is a view showing a mobile-type information processor such as a word processor or a personal computer. 1200 indicates the information processor, 1202 indicates an input portion such as a keyboard, 1206 indicates a liquid-crystal display portion using the liquid-crystal display device of the present invention, and the 1204 indicates the main body of the information processor.

Since each of the above-described electronic tools is driven by batteries, if a liquid-crystal display device without a back light is used, the life span of the batteries can be extended.

According to the present invention, light reflected by each reflective layer causes interference due to the light-transmissive thin films, and is colored into interference colors determined by the thicknesses and the refractive indexes of the light-transmissive thin films, thus being visibly recognized. It is, therefore, unnecessary to provide conventional transmission-type color filters, and accordingly, the quantity of reflected light is not reduced and the color tone does not vary in relation to the quantity of incident light. Further, since a color unit can be achieved only by controlling the thicknesses or the refractive indexes of the light-transmissive thin films, the manufacture of the unit is easier than the conventional case in which color filters are formed.

Further, if the reflective layer is made to be a conductive layer, the oxide film formed by anodic oxidation can be made to serve as a light-transmissive thin film. According to anodic oxidation, the film thickness can be controlled by controlling the applied voltage, and high-quality light-transmissive thin films can be formed with high reproducibility.

Moreover, if the reflective layer is made to be a metallic layer concurrently serving as a pixel electrode, it is unnecessary to newly provide a pixel electrode, the inner structure of the liquid-crystal display device can be simplified, and in addition, the manufacturing process becomes easier.

What is claimed is:

1. A liquid-crystal display device comprising:
   a reflective layer disposed for each of pixel regions where pixel electrodes are arranged on one substrate among a pair of substrates sandwiching liquid crystals; and
   a plurality of light-transmissive thin films on the surface of each reflective layer, each of the thin films having a predetermined thickness and a predetermined refractive index, wherein each of said reflective layers is a conductor, and said light-transmissive thin films are anodic oxide films formed into predetermined thicknesses by anodically oxidizing the surface of each of said reflective layers; and
   wherein light reflected by said reflective layers is colored into mutually-different interference colors which are substantially determined in accordance with the thicknesses and the refractive indexes of several types of said light-transmissive thin films.

2. The liquid-crystal display device according to claim 1, wherein each of said conductors comprises a valve metal.

3. The liquid-crystal display device according to claim 2, wherein said valve metal is a metal selected from the group including Al, Ti, V, Y, Zr, Nb, In, La, Hf, Ta, and W.

4. The liquid-crystal display device according to claim 1, wherein said reflective are metallic layers concurrently serving as said pixel electrodes.

5. A process for manufacturing a liquid-crystal display device, comprising the steps of:

forming a reflective layer for each pixel region where a plurality of pixel electrodes are arranged on the inner surface of one substrate among a pair of substrates sandwiching liquid crystals; and forming a plurality of light-transmissive thin films having a least one of different thicknesses and different refractive indexes corresponding to the colors of light reflected by said reflective layers;

wherein said reflective layers are formed with conductors, and each of said light-transmissive thin films are formed into predetermined thicknesses respectively by anodically oxidizing the surfaces of said reflective layers.

6. The process for manufacturing a liquid-crystal display device according to claim 5, further including the step of forming two-terminal-type active devices, each of which comprising a first electrode, an insulator obtained by anodically oxidizing said first electrode, and a second electrode, wherein said reflective layers are formed with the same material as that for said first electrode, and said light-transmissive thin films are formed at the same time as said step of forming said insulator.

7. A liquid crystal display unit comprising:

a pair of substrates;

a liquid crystal interposed between said pair of substrates;

a plurality of pixel electrodes formed on pixel regions of one of said pair of substrates;

a reflective layer disposed on a plurality of said pixel regions; and a plurality of light-transmissive thin films disposed on each of said reflective layers, said thin films reflecting light in different interference colors corresponding to at least one of a thickness and a refractive index of said thin films;

wherein said thin films comprise an anodically oxidized portion of said reflective layer.

8. The liquid crystal display unit of claim 7 wherein said plurality of light-transmissive thin films are different from one another.

9. The liquid crystal display unit of claim 7 wherein said plurality of light-transmissive thin films are each formed of the same material.

10. The liquid crystal display unit of claim 7 wherein said plurality of light-transmissive thin films have different thicknesses.

11. The liquid crystal display unit of claim 7 wherein said plurality of light-transmissive thin films have different indexes of refraction.

12. The liquid crystal display unit of claim 7 wherein said reflective layer further comprises a metal selected from the group including Al, Ti, V, Y, Zr, Nb, In, La, Hf, Ta and W.

13. The liquid crystal display unit of claim 7 wherein said reflective layer concurrently serves as said pixel electrodes.

* * * * *

UNITED STATES PATENT AND TRADEMARK OFFICE
CERTIFICATE OF CORRECTION

PATENT NO. : 6,104,459
DATED : August 15, 2000
INVENTOR(S) : Oike Kazuo; Kozo Gyoda It is certified that error appears in the above-identified patent and that said Letters Patent is hereby corrected as shown below:

Col. 8, line 65, "cas e" should be -- case --.

Signed and Sealed this

Twenty-ninth Day of May, 2001

Attest:

NICHOLAS P. GODICI

Attesting Officer      *Acting Director of the United States Patent and Trademark Office*